United States Patent
Sullivan et al.

(10) Patent No.: US 10,955,913 B2
(45) Date of Patent: *Mar. 23, 2021

(54) ADJUSTING CONTENT DISPLAY ORIENTATION ON A SCREEN BASED ON USER ORIENTATION

(71) Applicant: AT&T Intellectual Property I, L.P., Atlanta, GA (US)

(72) Inventors: Marc A. Sullivan, Round Rock, TX (US); James H. Pratt, Round Rock, TX (US); Garrett L. Stettler, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,938

(22) Filed: Jun. 5, 2019

(65) Prior Publication Data

US 2019/0286230 A1 Sep. 19, 2019

Related U.S. Application Data

(63) Continuation of application No. 15/650,505, filed on Jul. 14, 2017, now Pat. No. 10,324,526, which is a continuation of application No. 14/839,186, filed on Aug. 28, 2015, now Pat. No. 9,740,284, which is acontinuation of application No. 13/633,636, filed on Oct. 2, 2012, now Pat. No. 9,123,142.

(51) Int. Cl.
*G06F 3/01* (2006.01)
*G06T 3/60* (2006.01)
(Continued)

(52) U.S. Cl.
CPC ......... *G06F 3/013* (2013.01); *G02B 27/0093* (2013.01); *G06K 9/0061* (2013.01);
(Continued)

(58) Field of Classification Search
CPC ... G06F 3/013; G06F 2200/1614; G09G 5/00; G09G 2340/0492; G09G 2320/028;
(Continued)

(56) References Cited

U.S. PATENT DOCUMENTS 6,608,615 B1 8/2003 Martins
7,680,322 B2 3/2010 Tooyama et al.
(Continued)

*Primary Examiner* — Maurice L. McDowell, Jr.
(74) *Attorney, Agent, or Firm* — Guntin & Gust, PLC; Kenneth Kwan

(57) ABSTRACT

A system for adjusting content display orientation on a screen is disclosed. The system may include a processor that may detect both eyes and a body part of a user that is proximal to one or more of the user's eyes. The system may then determine an eye gaze plane based on the positions of the first and second eyes of the user. The eye gaze plane may be determined by identifying a first line of sight extending from the first eye and a second line of sight extending from the second eye. Additionally, the eye gaze plane may bisect a center of the first eye and a center of the second eye of the user. Once the eye gaze plane is determined, the system may adjust the orientation of content displayed on a display device based on the eye gaze plane and on the position of the body part.

20 Claims, 8 Drawing Sheets

(51) Int. Cl.
   *G02B 27/00* (2006.01)
   *G06T 7/73* (2017.01)
   *G09G 5/00* (2006.01)
   *G06K 9/00* (2006.01)
   *G06K 9/52* (2006.01)
   *G06T 3/00* (2006.01)

(52) U.S. Cl.
   CPC ............... *G06K 9/52* (2013.01); *G06T 3/00* (2013.01); *G06T 3/60* (2013.01); *G06T 7/73* (2017.01); *G09G 5/00* (2013.01); *G06F 2200/1614* (2013.01); *G09G 2320/028* (2013.01); *G09G 2320/0261* (2013.01); *G09G 2340/0492* (2013.01)

(58) Field of Classification Search
   CPC ..... G09G 2320/0261; G06T 7/73; G06T 3/00; G06T 3/60; G06K 9/52; G06K 9/0061; G02B 27/0093
   See application file for complete search history.

(56) References Cited

U.S. PATENT DOCUMENTS

| | | | |
|---|---|---|---|
| 8,358,321 B1 * | 1/2013 | Weidner | G09G 5/00 345/619 |
| 8,717,285 B1 | 5/2014 | White et al. | |
| 9,123,142 B2 * | 9/2015 | Sullivan | G09G 5/00 |
| 9,740,284 B2 * | 8/2017 | Sullivan | G09G 5/00 |
| 10,324,526 B2 * | 6/2019 | Sullivan | G09G 5/00 |
| 2004/0174496 A1 | 9/2004 | Ji et al. | |
| 2007/0252853 A1 | 11/2007 | Park et al. | |
| 2009/0304232 A1 | 12/2009 | Tsukizawa | |
| 2010/0066667 A1 * | 3/2010 | MacDougall | G06K 9/00228 345/156 |
| 2010/0088532 A1 | 4/2010 | Pollock et al. | |
| 2010/0088639 A1 | 4/2010 | Yach et al. | |
| 2010/0222046 A1 | 9/2010 | Cumming | |
| 2011/0001762 A1 * | 1/2011 | Li | G06K 9/00604 345/649 |
| 2011/0032220 A1 * | 2/2011 | Shih | G06F 1/1694 345/204 |
| 2011/0102451 A1 | 5/2011 | Broga et al. | |
| 2011/0298829 A1 * | 12/2011 | Stafford | G06K 9/00248 345/659 |
| 2012/0001943 A1 * | 1/2012 | Ishidera | G06F 3/0346 345/659 |
| 2012/0075166 A1 | 3/2012 | Marti et al. | |
| 2012/0081392 A1 * | 4/2012 | Arthur | H04N 5/23222 345/633 |
| 2012/0324256 A1 | 12/2012 | Deakin et al. | |
| 2014/0009387 A1 * | 1/2014 | Hwang | G06F 1/1694 345/156 |
| 2014/0049563 A1 * | 2/2014 | Tobin | G06F 3/012 345/649 |
| 2014/0118509 A1 | 5/2014 | Kroon | |

* cited by examiner

ADJUSTING CONTENT DISPLAY ORIENTATION ON A SCREEN BASED ON USER ORIENTATION

CROSS REFERENCE TO RELATED APPLICATIONS

This application claims priority to and is a continuation of U.S. patent application Ser. No. 15/650,505 filed Jul. 14, 2017, which is a continuation of U.S. patent application Ser. No. 14/839,186 filed Aug. 28, 2015, now U.S. Pat. No. 9,740,284 which is a continuation of U.S. patent application Ser. No. 13/633,636 filed Oct. 2, 2012, now U.S. Pat. No. 9,123,142, each of which are hereby incorporated by reference in their entireties.

FIELD OF THE INVENTION

The present application relates to display orientation, and more particularly, to a system and method for adjusting display orientation based on user orientation.

BACKGROUND

In today's society, people have been increasingly adopting use of devices such as mobile phones, computer tablets, interactive displays, and laptops over traditional personal computers for a variety of things including work, entertainment, or other tasks. With such widespread acceptance, engineers and scientists have had to develop a variety of technologies and systems to ensure that the users can view and access content on such devices as effectively and as easily as possible. For example, technologies have been developed to automatically adjust the display orientation of media content at 90 degree increments based on a device's position relative to the force of gravity. Many smartphones or computer tablets, which often have a rectangular shape, often utilize technology that allow them to change the orientation of content that is displayed at 90 degree increments based on the smartphone or tablet being held in a particular position. Such smartphones or tablets typically use internal gyroscopes to sense the position of the device relative to the force of gravity and adjust the orientation of the content displayed on the screen of the smartphone or tablet at 90 degree increments only when the position of the smartphone or tablet is changed by more than a predetermined threshold position variable. In addition to using gyroscopes, some technologies utilize accelerometers to measure the rate of acceleration and use the measure rate of acceleration to adjust the orientation of the content by 90 degree increments only.

SUMMARY

A system and accompanying methods for adjusting content display orientation on a screen based on a user's orientation are disclosed. The system may be configured to determine the positions of a user's eyes and the position of the user's nose to adjust the content display orientation displayed on a device that the user is interacting with. In order to do so, the position of the user's eyes may be used by the system to determine an eye gaze plane that is formed based on the line of sight for each eye of the user. Additionally, the eye gaze plane may be configured to bisect the center of each of the eyes of the user. Once the eye gaze plane is determined, any content that the user is viewing on the device may be aligned with the eye gaze plane in real time or periodically, and the content display orientation may be based both on the eye gaze plane and on the position of the user's nose relative to the eye gaze plane. By ensuring that the orientation of the content is based on the eye gaze plane and on the position of the user's nose relative to the eye gaze plane, the user may enjoy content on the device without having to worry about how the user holds the device or if the user changes his or her position.

The system for adjusting content display orientation on a screen may include a memory that stores instructions and a processor that executes the instructions to perform operations. The processor may determine an eye gaze plane based on a position of a first eye and a position of a second eye of a user located in a vicinity of a display device by executing instructions stored in memory. The eye gaze plane may be determined by identifying a first line of sight extending from the first eye and identifying a second line of sight extending from the second eye. Additionally, the eye gaze plane may bisect a center of the first eye and a center of the second eye. Furthermore, the processor may adjust the content display orientation displayed on the display device such that content is aligned with the eye gaze plane. Notably, the content display orientation may be based on the eye gaze plane and a position of a body part positioned proximally relative to the first eye of the user.

In another embodiment, a method for adjusting content display orientation on a screen is provided. The method may include determining an eye gaze plane based on a position of a first eye and a position of a second eye of a user located in a vicinity of a display device by utilizing a processor. The eye gaze plane may be determined by identifying a first line of sight extending from the first eye and identifying a second line of sight extending from the second eye. Also, the eye gaze plane may bisect a center of the first eye and a center of the second eye. The method may also include adjusting the content display orientation displayed on the display device such that the content is aligned with the eye gaze plane by utilizing the processor. The content display orientation may be based on the eye gaze plane and a position of a body part positioned proximally relative to the first eye of the user.

According to another exemplary embodiment, a computer-readable medium comprising instructions for adjusting content display orientation on a screen is provided. The computer instructions, which when loaded and executed by an electronic processor, may cause the electronic processor to perform activities comprising: determining an eye gaze plane based on a position of a first eye and a position of a second eye of a user located in a vicinity of a display device, wherein the eye gaze plane is determined by identifying a first line of sight extending from the first eye and identifying a second line of sight extending from the second eye, wherein the eye gaze plane bisects a center of the first eye and a center of the second eye; and adjusting the content display orientation displayed on the display device such that the content is aligned with the eye gaze plane, wherein the content display orientation is based on the eye gaze plane and a position of a body part positioned proximally relative to the first eye of the user.

These and other features of the screen orientation systems and methods are described in the following detailed description, drawings, and appended claims.

DETAILED DESCRIPTION OF THE INVENTION

Figure 1A:
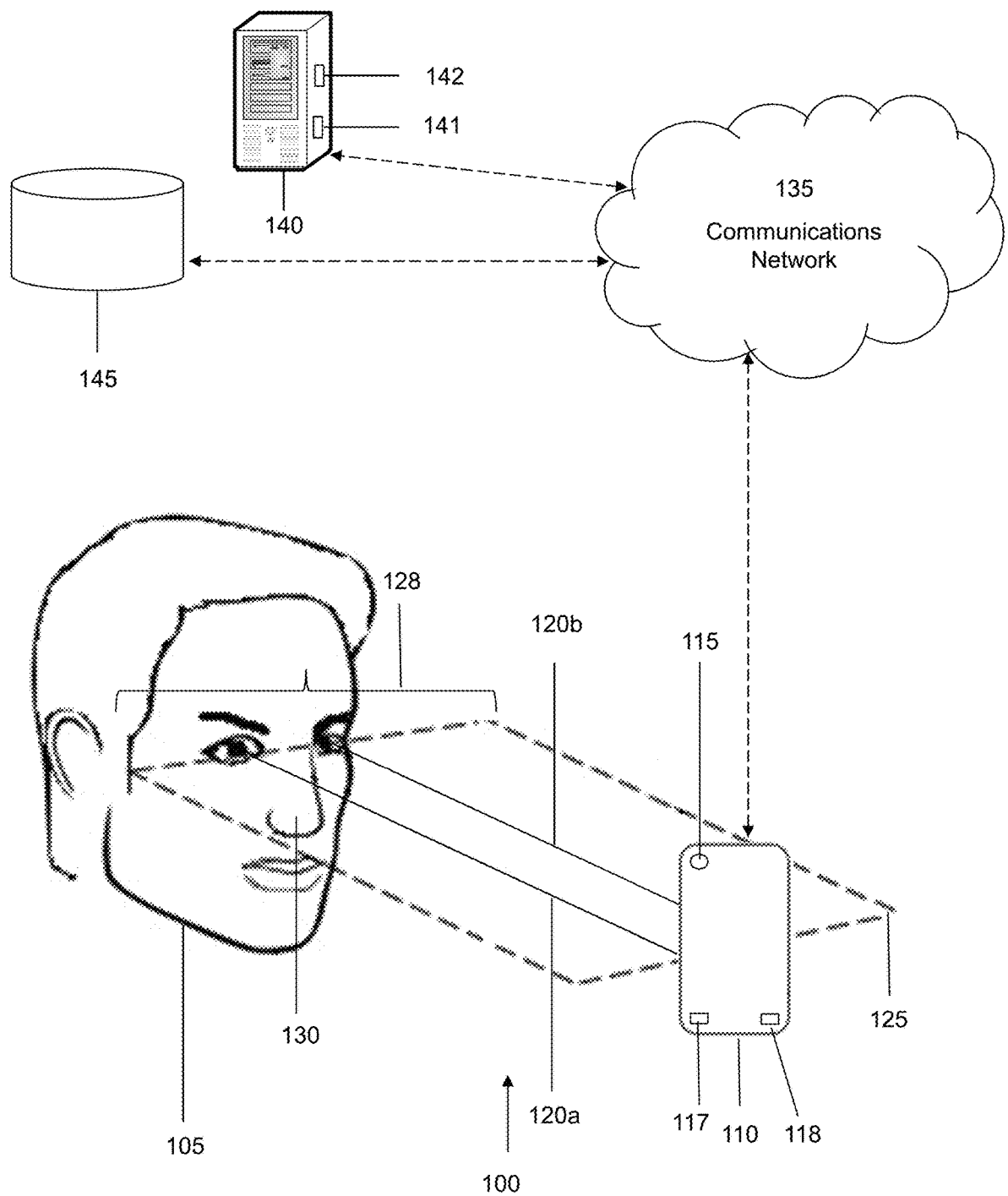
FIG. 1A is a schematic illustration featuring a view a system for adjusting the content display orientation on a screen of a display device based on a user's orientation according to an embodiment of the present disclosure.

A system 100 for adjusting content display orientation based on user orientation is disclosed in the present disclosure. As users have been increasingly using devices such as mobile phones, computer tablets, interactive displays, and laptops for performing various tasks or enjoying entertainment, such users often interact with such devices in a variety of positions or situations. For example, users often interact with these devices while standing, sitting, lying down, walking, or running, and users even may adjust the position of these devices so that they can interact with the devices in different ways. Referring to the drawings and in particular to FIGS. 1-4, the system 100 may enable a user 105 to view content 112 on a device 110 so that the content 112 is aligned with the user's eye gaze plane 125 and oriented based on the user's body part 130 even when the user 105 changes his or her position, or when the user 105 changes the position of the device 110, or both.

Figure 1B:
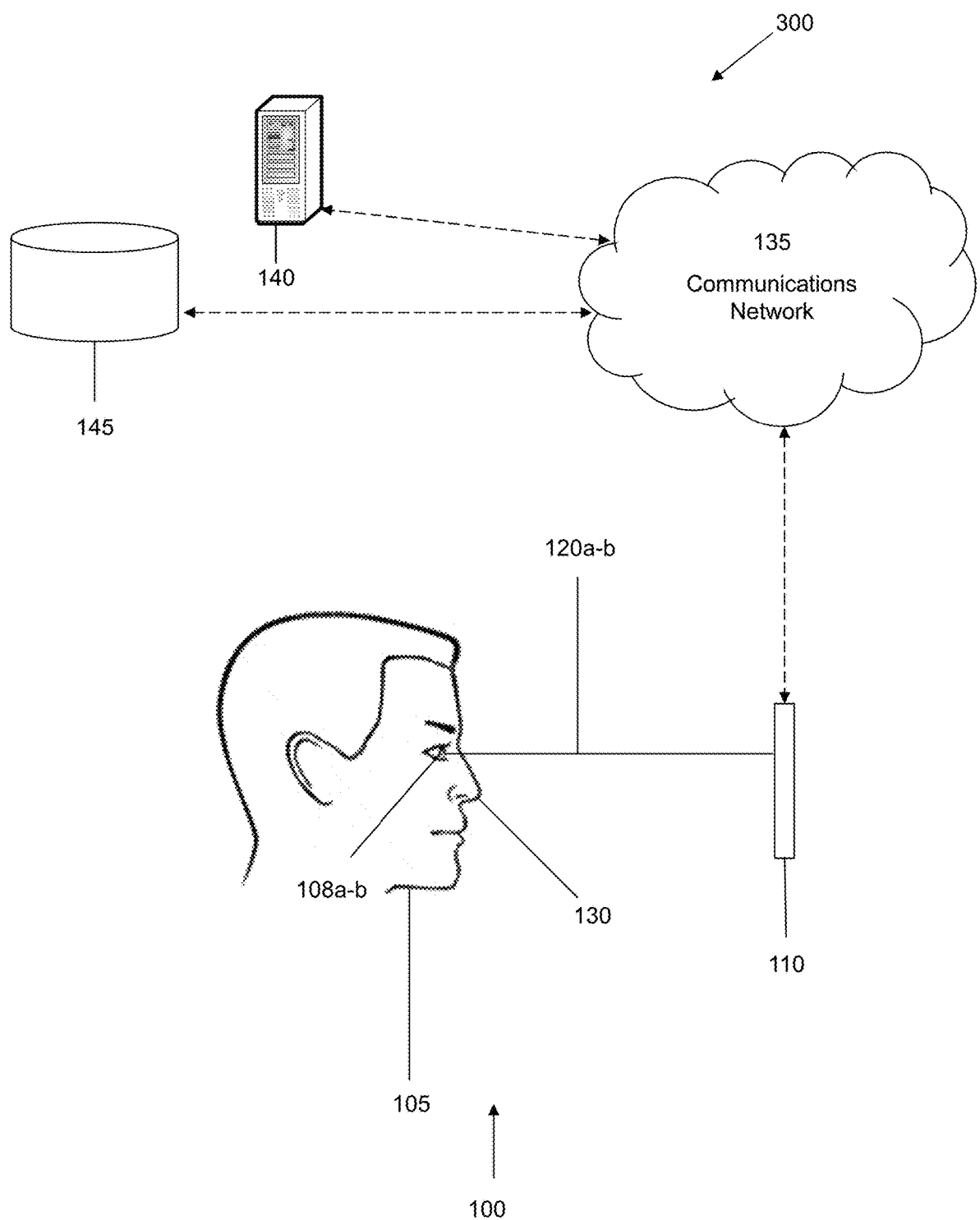
FIG. 1B is a schematic illustration featuring a side view of the user of the system of FIG. 1.
Figure 2:
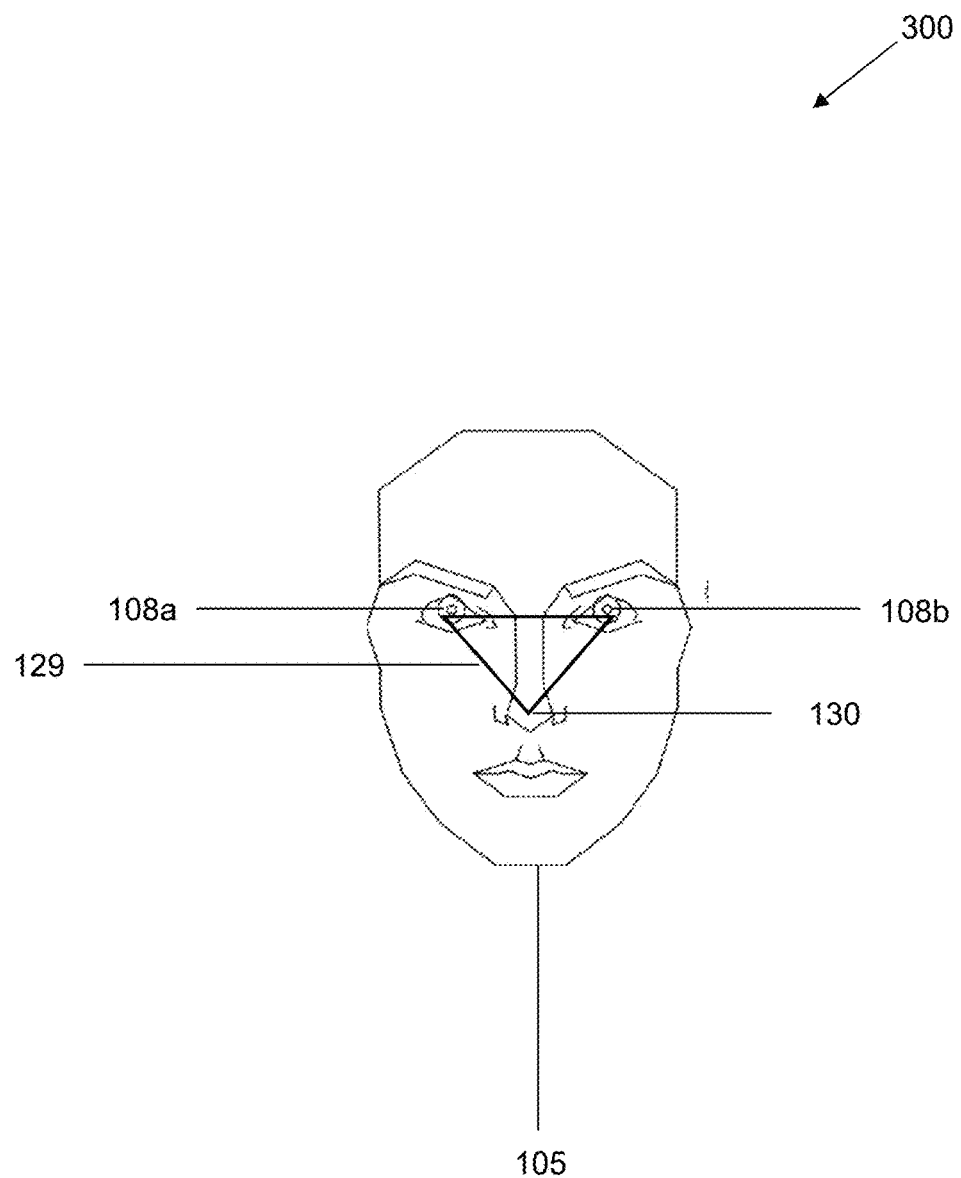
FIG. 2 is an illustration depicting the references points on the user's face utilized in adjusting the content display orientation on the screen of the display device in the system of FIG. 1.

In order to effectively align the content 112 displayed on the device 110, the system 100 may be configured to determine the positions of the user's eyes 108a-b and the position of a body part 130 of the user. The body part 130 is shown in FIG. 1-3 as a nose, however, the body part 130 may be any part of the user 105 that is positioned proximally relative to either eye 108a-b of the user 105 or to any other desired reference point or points. The position of the user's eyes 108a-b may be used by the system 100 to determine an eye gaze plane 125 that is formed based on identifying a first line of sight 120a for the first eye 108a and identifying the second line of sight 120b for the second eye 108b of the user 105. Additionally, the eye gaze plane 125 may be configured to bisect the center of each of the eyes 108a-b of the user 105, and is shown as line 128 in FIG. 1A. The eye gaze plane 125 may be parallel or directly in line with the line of sights 120a-b of the user 105. Once the eye gaze plane 125 is determined, any content 112 that the user 105 is viewing on the device 110 may be aligned with the eye gaze 125 plane in real time. For example, real time may be construed as aligning the content 112 with the eye gaze plane 125 within milliseconds, microseconds, or other miniscule unit of time of the eye gaze plane 125 changing position. In one embodiment, real time may be construed to mean that the content 112 is aligned with the eye gaze plane 125 as the eye gaze plane 125 changes. The content display orientation of the content 112 may be based both on the eye gaze plane 125 and on the position of the user's body part 130. Also, the eye gaze plane 125 and the position of the user's body part 130 may collectively be a reference zone 129 for use in adjusting the content display orientation of the content 112. By ensuring that the orientation of the content 112 is based on the eye gaze plane 125 and on the position of the user's body part 130, the user may enjoy content 112 on the device 110 without having to worry about how the user 105 holds the device 110 or if the user 105 changes his or her position with respect to the device 110.

Notably, the system 100 may utilize a combination of software and hardware to perform the operative functions of the system 100 disclosed herein. Additionally, although FIGS. 1-4 illustrate specific example configurations of the various components of the system 100, the system 100 may include any configuration of the components, which may include using a greater or lesser number of the components. For example, the system 100 is illustratively shown as including a user 105 and a device 110, and as optionally including a communications network 135, a server 140 and a database 145. However, the system 100 may include multiple devices 110, multiple servers 140, multiple networks 135, and multiple databases 145. Furthermore, in one embodiment, the entire functionality of the system 100 may be performed by the device 110 itself without need for the communications network 135, the server 140, or the database 145, or any combination thereof.

Operatively, the system 100 may be configured to initially determine or detect a position of the first eye 108a of the user 105, a position of the second eye 108b of the user 105, and a position of a body part 130 of the user 105. In one embodiment, the user 105 may be located in a vicinity of the device 110. The position of the first eye 108a, the position of the second eye 108b, and the position of the body part 130 of the user 105, may be determined by the device 110 itself. Illustratively, the device 110 is shown as a mobile phone, however, the device 110 may also be a computer tablet, a personal computer, a television, an interactive display, or any other device that may be utilized by a user 105 to view content 112. Additionally, the device 110 may include or otherwise be communicatively linked to one or more electronic processors 117 that may be configured to perform or process any of the operations conducted in the system 100. The electronic processors 117 may be software, hardware, or a combination of hardware and software. The device 110 may also include a memory 118, which may be configured to store instructions that the electronics processors 117 may execute to perform various the operations of the system 100. Notably, the device 110 may be communicatively linked with any of the components in the system 100 and may transmit information associated with the user 105 or the device 110 to any of the other components in the system 100, such as via communications network 135.

The device 110 may capture the position data for the eyes 108*a-b* and the body part 130 by recording media content of the user 105 by using an image capture device 115. Illustratively, the image capture device 115 is shown as a user-facing camera embedded within the device 110 itself, however, the image capture device 115 may be positioned in any location that would allow the image capture device 115 to determine the position data of the user 105. Additionally, the image capture device 115 may be a video camera or other type of recording device that may be utilized to record media content associated with the user 105. The media content recorded by the image capture device 115 may include visual content, audio content, or any other recordable content. The image capture device 115 may begin recording media content associated with the user 105 once the user 105 selects an option to activate the camera 115 on the device 110. For example, the user 105 may select an option displayed on a touchscreen interface of the device 110 to initiate recording of the media content.

After recording is initiated by the image capture device 115, the system 100 may determine the position data for the eyes 108*a-b* and the body part 130 based on the recorded media content. For example, the system 100 may determine the position data by utilizing contrast detection of a video image of the user 105 that is captured by the image capture device 115. Contrast detection may also be utilized to find the perimeter of each iris for each of the user's 105 eyes 108*a-b* against the sclera of each eye 108*a-b*. Once the position data is determined, the device 110 can determine the eye gaze plane 125 for the user 105 based on identifying the first line of sight 120*a* extending from the first eye 108*a*, the second line of sight 120*b* extending from the second eye 108*b*, and the line 128 bisecting the center of each of the eyes 108*a-b* of the user 105. FIG. 1A illustratively shows how the eye gaze plane 125 may be based on the line of sights 120*a-b* and the line 128 bisecting the center of each of the eyes 108*a-b*.

Additionally, the system 100 can determine the reference zone 129 of the user 105 based on the eye gaze plane 125 and the position of the body part 130 of the user 105. The body part 130 may be utilized as a reference point between the top and bottom of the user's 105 gaze region. The reference zone 129 may be a region of the user's 105 face that may be utilized to adjust the content display orientation of the content 112 displayed on the device 110. Also, the reference zone 129 may be different for each unique user 105. Notably, the device 110 may determine all of this information by itself, or the device 110 may optionally utilize the processing power of the server 140 and the storage capacity of the database 145 via communications network 135. Furthermore, the device 110 may be configured to continuously determine the position data for the eyes 108*a-b* and body part 130 whenever the user 105 adjusts his or her position. Moreover, the device 110 may be configured to determine position and other data for any number of users 105, and may be configured to detect which user 105 is using the device 110 based on position data history stored in the system 100.

The server 140 may include one or more electronic processors 141, which may be configured to handle any necessary processing for carrying out any and all of various operative functions of the system 100. The electronic processors 141 may be software, hardware, or a combination of hardware and software. Additionally, the server 140 may also include a memory 142, which may be configured to store instructions that the electronics processors 141 may execute to perform various the operations of the system 100. For example, the server 140 may receive the position data for the user 105 from the device 110 and perform the necessary operations to determine the eye gaze plane 125 and the reference zone 129. In one embodiment, multiple servers 140 may be utilized to process the functions of the system 100. The server 140 or the device 110, or both, may utilize the database 145 for storing the eye and body part position data for the user 105, an eye gaze plane history for the user 105, a reference zone history for the user 105, along with any other data that the devices in the system 100 may utilize in processing. Additionally, the database 145 may store data for any number of users 105. In an embodiment, multiple databases 145 may be utilized to store data in the system 100. Furthermore, the communications network 135 may be any other suitable network that may be utilized to allow the various components of the system 100 to communicate with one another. For instance, the communications network 135 may be a wireless network, an ethernet network, a satellite network, a broadband network, a cellular network, a private network, a cable network, the Internet, any combination thereof.

Figures 3A, 3B:
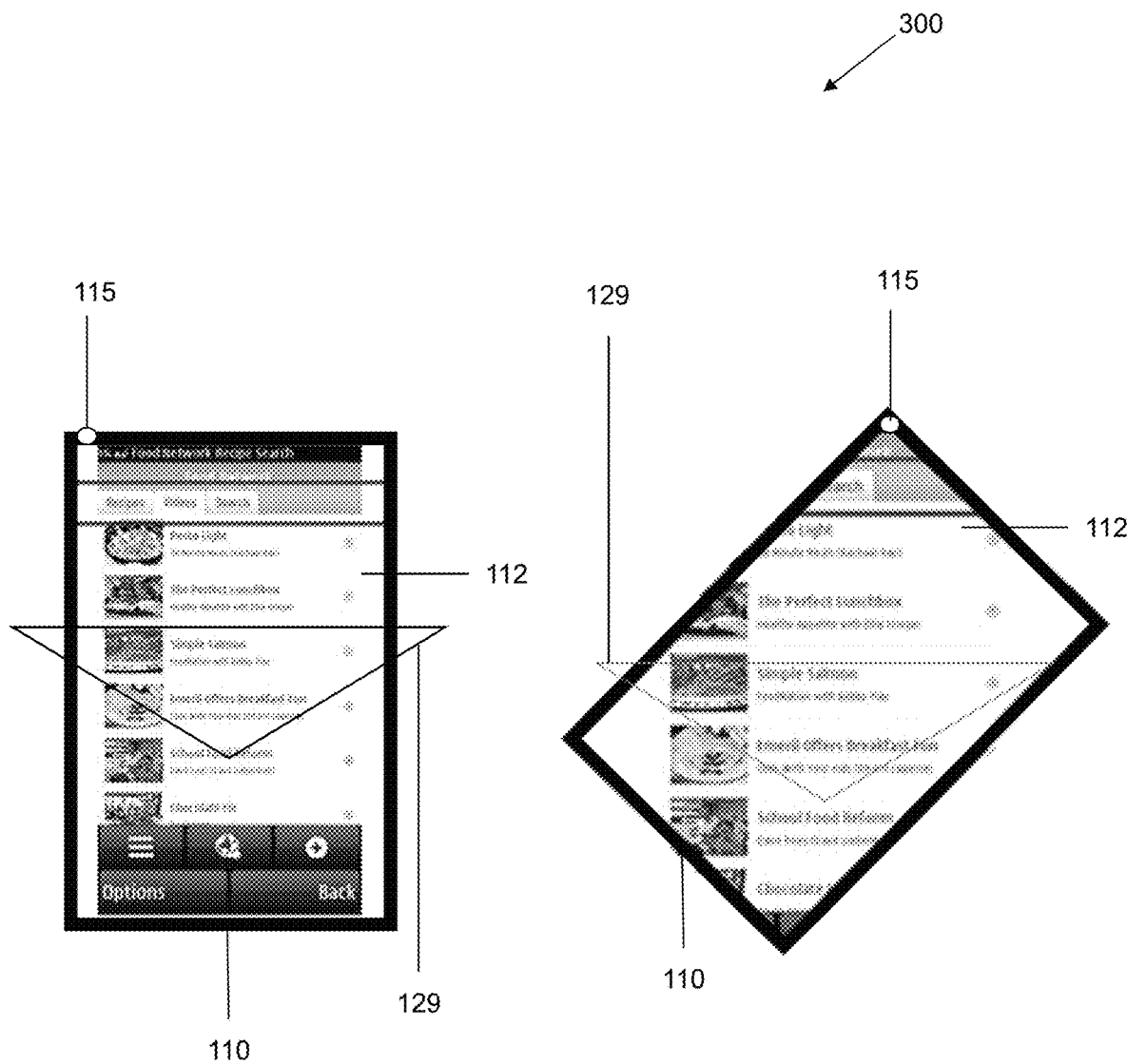
FIG. 3A is an illustration of the display device of FIG. 1 in an upright position that is displaying media content that is oriented based on the user's eye gaze plane and nose.
FIG. 3B is an illustration of the display device of FIG. 1 in a tilted position that is displaying media content that is oriented based on the user's eye gaze plane and nose.

Once the eye gaze plane 125 and the position of the body part 130 are determined, the system 100 may be configured to adjust the content display orientation of the content 112 displayed on the device 110 based on the eye gaze plane 125 and the position of the body part 130. As an example scenario and referring more particularly to FIGS. 3A and 3B, if the user 105 is in an upright position and viewing a web page on the device 110 that shows a list of food items that the user 105 is interested in, the device 110 may display the web page such that the content 112 is aligned with the user's 105 eye gaze plane 125 and oriented based on the position of the user's body part 130. In FIG. 3A, the device 110 is held in an upright position in front of the user's face and the content 112 is displayed so that content 112 is directly aligned with the user's 105 eye gaze plane 125. Additionally, the content 112 is displayed in upright orientation because the device 110 has determined that based on the position of the body part 130, the content 112 should be displayed in an upright orientation to match the user's orientation. However, if the device 110 is moved to a titled position, as shown in FIG. 3B, the system 100 can determine if the user 105 has changed position. If the user 105 is determined to be in the same upright position as in FIG. 3A, the system 100 can ensure that the content display orientation remains the same as the upright content display orientation as shown in FIG. 3A, despite the new position of the device 110. As a result, the content display orientation is based on the user's orientation. As another example, if the user 105 tilts his head to the right by 90 degrees, the position data will change by 90 degrees and the content display orientation of the content 112 will be changed to be aligned with the new position data of the user 105. In one embodiment, the content display orientation of the content 112 may be changed by the system 100 in real time as the user 105 moves his position or changes the position of the device 110, or both.

Figures 4A, 4B:
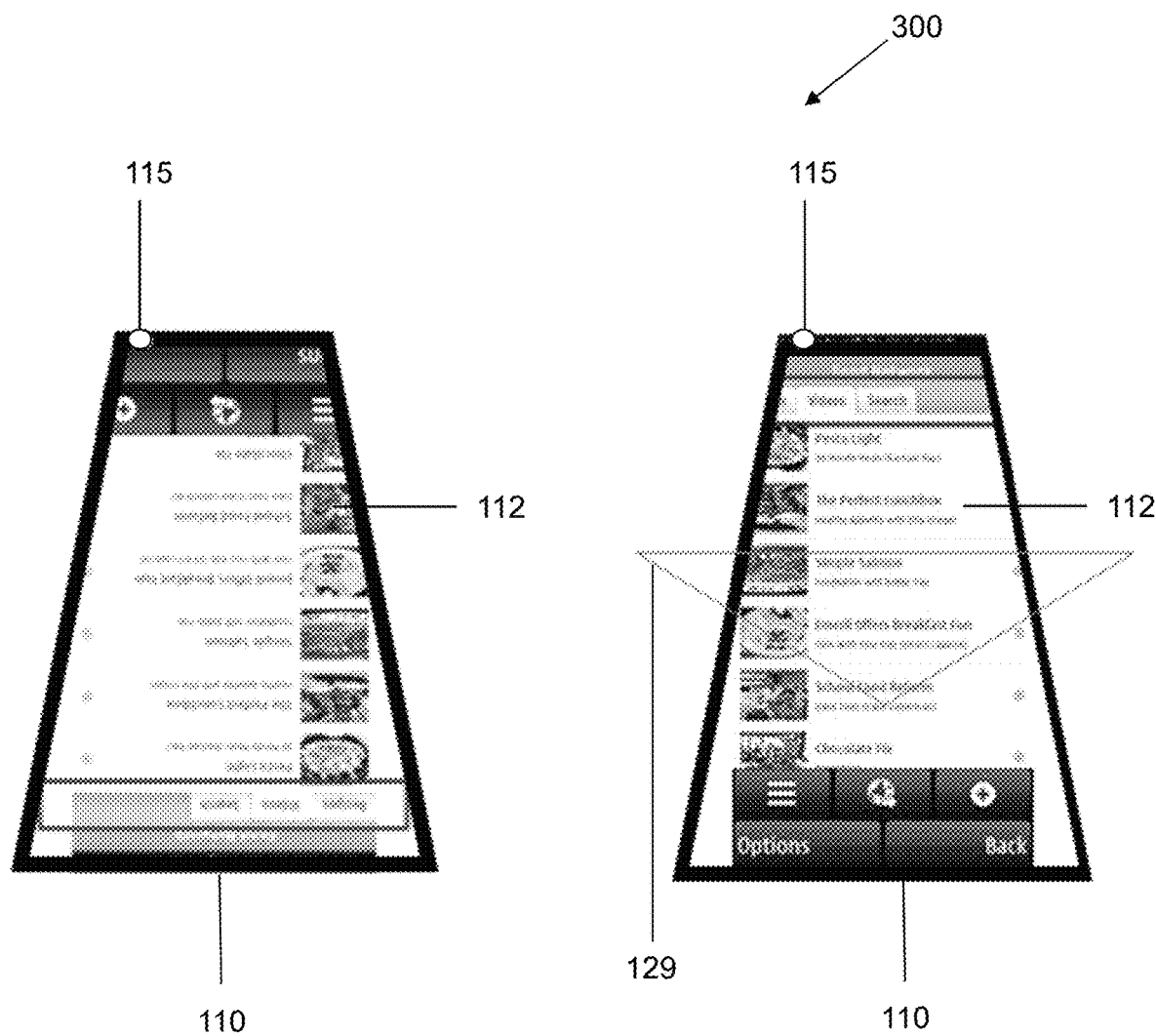
FIG. 4A is an illustration of the display device of FIG. 1 in a position that is tilted away from the user and the display device is displaying media content that is not oriented using the system of FIG. 1.
FIG. 4B is an illustration of the display device of FIG. 1 in a position that is tilted away from the user and the display device is displaying media content that is oriented using the system of FIG. 1.

In a different example scenario, instead of titling the device 110 to the right or to the left, the user 105 may tilt the device 110 away from himself, as shown in FIGS. 4A and 4B. If the user 105 tilts the device 110 away from himself and is not using system 100 to adjust the content display orientation, the content display orientation of the content 112 may become inverted, as shown in FIG. 4A. Inversion may occur, for example, if the user 105 is not using the system 100 and the device 110 is using only a gyroscope to adjust content display orientation. If the content display orientation is inverted, the user 105 may be unable to read, enjoy, or effectively interact with the content 112. However, if the user 105 uses the system 100 and tilts the device 110 away from himself, the system 100 may determine that the user 105 is in an upright position and that the content display orientation should not be inverted even though the device 110 is tilted away from the user 105. As a result, the content display orientation may be held steady by the system 100 by utilizing the processor 118, for example. This can be clearly seen in FIG. 4B.

Figure 5:
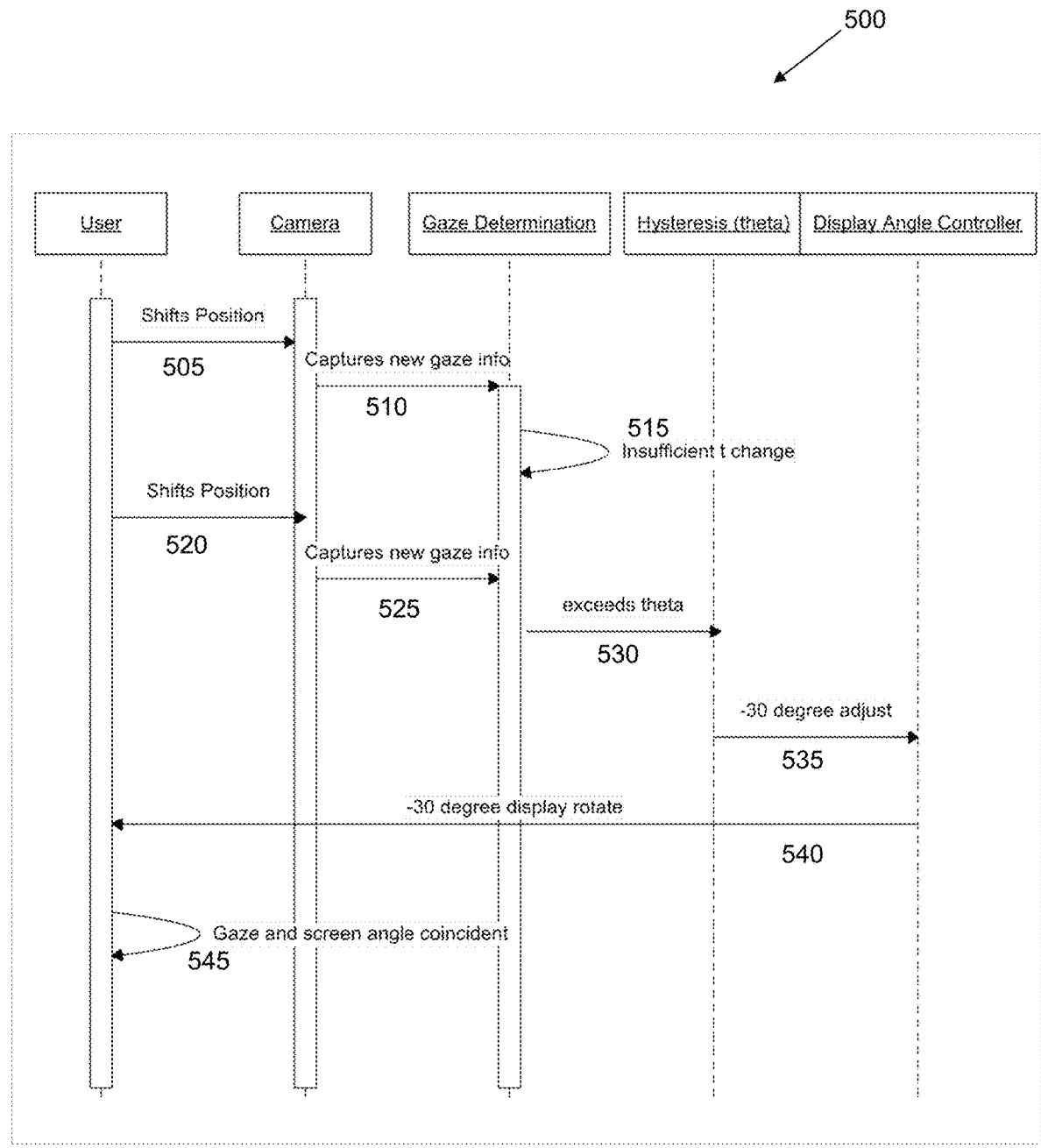
FIG. 5 is a flow diagram illustrating a sample method for adjusting the content display orientation of a display device based on a user's orientation according to the present disclosure.

An exemplary method 500 for adjusting content display orientation on a screen based on user orientation, as shown in FIG. 5, involves a situation where a user 105 shifts his position multiple times. The method 500 may include, at step 505, having the user 105 shift his position. When the user 105 shifts his position, the system 100 may capture new position data for the user's 105 eyes 108a-b and body part 130 at step 510. In one embodiment, the new position data may be captured by the device 110, server 140, any combination thereof, or other appropriate device. A user's 105 position is typically not steady, and as a result, incorporating some level of hysteresis into the system 100 may prevent unwanted adjusting of the content display orientation, particularly for minor changes in the user's 105 position. The hysteresis factor may be utilized by the system 100 to adjust the content display orientation on the device 110 only when there is a significant enough mismatch that occurs between the content display orientation of the device 110 and the user's orientation. As a result, the method 500 may include determining if the eye gaze plane 125, reference zone 129, body part 130, or a combination thereof, has changed position or orientation by greater than a threshold amount. This threshold amount may be designated by theta (Θ). At step 515, the method 500 may include determining that the user's 105 orientation and position data has not changed by greater than the threshold amount. At this point, the system 100 will not change the content display orientation. In one embodiment, the determination that the user's 105 orientation and position data has not changed by more than a threshold amount may be performed by the device 110, server 140, any combination thereof, or other appropriate device.

At step 520, the method 500 may include having the user 105 shift his position again. When the user 105 shifts his position again, the system 100 may capture newer position data for the user's 105 eyes 108a-b and body part 130 at step 525. In one embodiment, the newer position data may be captured by the device 110, server 140, any combination thereof, or other appropriate device. At step 530, the method 500 may include determining that the user's orientation and position data have changed by greater than the threshold amount to warrant a change in content display orientation. In one embodiment, the determination that the user's 105 orientation and position data have changed by greater than a threshold amount may be performed by the device 110, server 140, any combination thereof, or other appropriate device. At the point that the threshold amount is exceeded, the content display orientation should smoothly rotate to realign the content display orientation of the device 110 with the new position data and orientation of the user 105. As a result, at step 535, the method 500 may include determining how many degrees of adjustment are needed for aligning the content display orientation with the user's orientation. In one embodiment, determining the degrees of adjustment may be performed by the device 110, server 140, any combination thereof, or other appropriate device. At step 540, the method 500 may include adjusting the content display orientation of content displayed on the device 110 by the appropriate amount of degrees to align the content display orientation with the user's orientation, which is based on the new position data. For example, the user 105 may have changed his position such that it would warrant a change in content display orientation of −30 degrees as shown in FIG. 5. In one embodiment, adjusting the content display orientation may be performed by the device 110, server 140, any combination thereof, or other appropriate device. At step 545, the method 500 may include determining that the user's orientation and the content display orientation or angle are aligned and coincide properly. In one embodiment, determining that the user's orientation and the content display orientation or angle are aligned and coincide properly may be performed by the device 110, server 140, any combination thereof, or other appropriate device.

Figure 6:
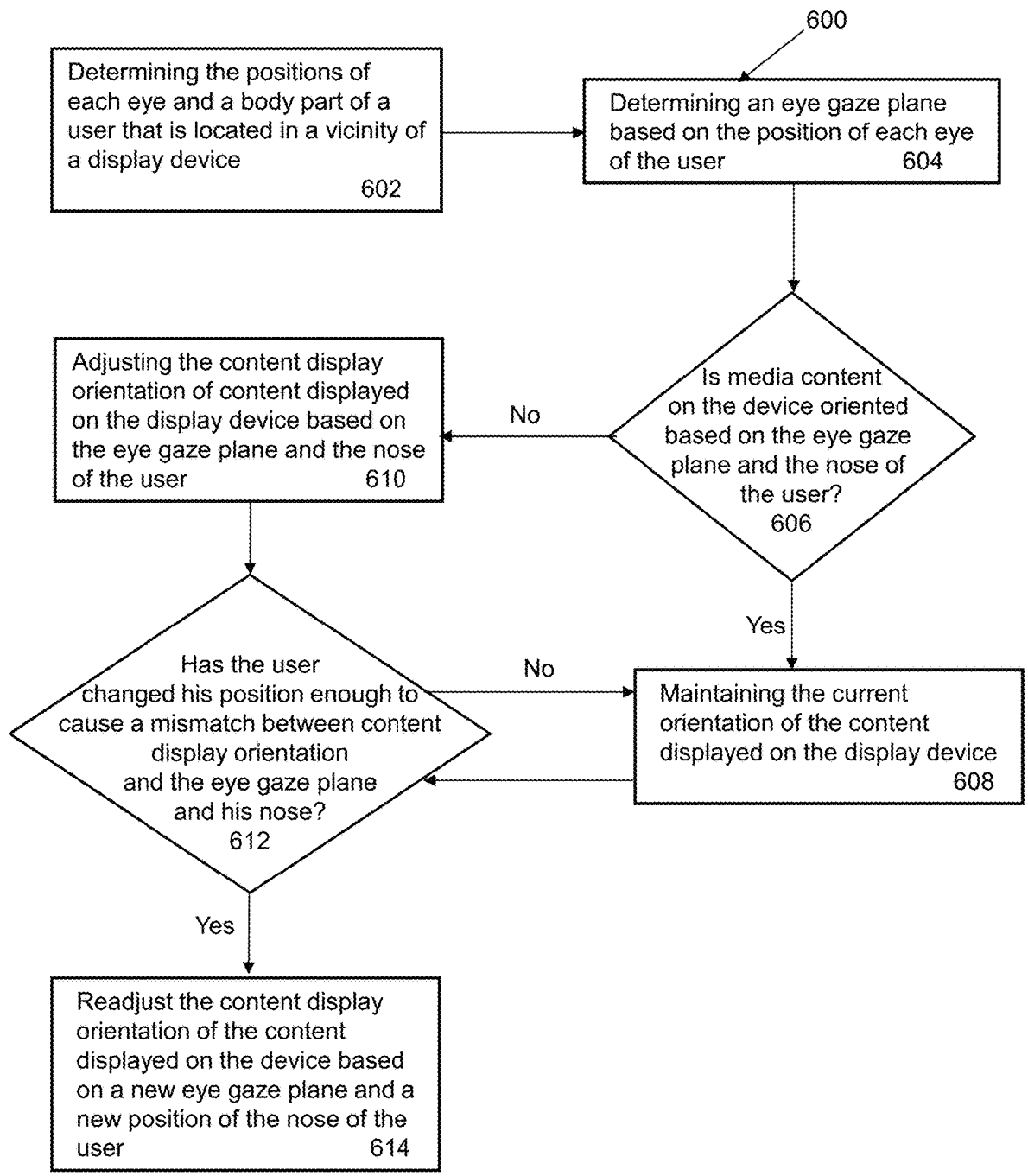
FIG. 6 is a flow diagram illustrating another method for adjusting the content display orientation of a display device based on a user's orientation according to the present disclosure.

In another exemplary method 600 for adjusting content display orientation on a screen based on user orientation, as shown in FIG. 6, the method 600 may include, at step 602, determining a position of a first eye of the user 105, the position of the second eye of the user, and the position of a body part 130. In one embodiment, the body part 130 may be positioned proximally relative to the first eye 108a of the user 105, to the second eye 108b of the user 105, or to any other desired reference point of the user 105. Additionally, the user 105 may be located in a vicinity of the device 110. In one embodiment, position information may be determined by the device 110, server 140, any combination thereof, or other appropriate device. At step 604, the method 600 may include determining an eye gaze plane 125 based on the position of each eye 108a-b of the user 105. In one embodiment, the eye gaze plane 125 may be determined by the device 110, server 140, any combination thereof, or other appropriate device. At step 606, the method 600 may include determining if the content display orientation of the content 112 on the device 110 is already oriented based on the eye gaze plane 125 and the body part 130. If the content display orientation is already oriented based on the eye gaze plane 125 and the body part 130, then the method 600 may include maintaining the current content display orientation of the content 112 on the device 110. However, if the content display orientation is not oriented based on the eye gaze plane 125 and the body part 130, the method 600 may include, at step 610, adjusting the content display orientation of the device 110 to be aligned with the eye gaze plane 125 and oriented based on the body part 130. In one embodiment, maintaining or adjusting the content display orientation may be performed by the device 110, server 140, any combination thereof, or other appropriate device.

At step 612, the method 600 may include determining if the user 105 has changed his position enough to cause enough of a mismatch between the content display orientation and the eye gaze plane 125 and body 130 such that the content display orientation would need to be adjusted again. In one embodiment, the mismatch may be determined by the device 110, server 140, any combination thereof, or other appropriate device. If there is not enough of a mismatch after the user 105 has changed his position, the method 600 may include maintaining the current content display orientation of the device 110 and going back to step 608. However, if there is enough of a mismatch after the user 105 has changed his position, the method 600 may include readjusting the content display orientation of the content on the device 110 such that the content display orientation is aligned with the new eye gaze plane 125 and oriented based on the new position of the body part 130 at step 614. In one embodiment, maintaining or readjusting the content display orientation may be performed by the device 110, server 140, any combination thereof, or other appropriate device.

In one embodiment, the system 100 and methods described herein may include adjusting the orientation for receiving any gestures or interactions from the user 105 to match an adjusted content display orientation. For example, if the system 100 adjusts the content display orientation to be aligned with a current user's 105 orientation, the orientation for receiving gestures may be matched to the content display orientation. In FIG. 3A, for example, the user 105 would swipe the touchscreen of the device 110 right to left or up or down based on the vertical alignment of the content 112. In FIG. 3B, however, which shows the tilted device 110 and the content display orientation aligned with the user's 105 orientation, the system 100 can change the orientation for interacting with the device 110 so that the user 105 can swipe or interact with the device 110 based on the orientation of the content 112 and not the orientation of the tilted device 110. For example, in FIG. 3B, a swipe gesture may be directly right to left aligned with the content 112 displayed, and not the titled orientation of the device 110 itself.

In one embodiment, the system 100 and methods described herein may further include utilizing any of the various components described in the system 100 in conjunction with an accelerometer. The accelerometer may be used to measure a rate of acceleration, and, in turn, measure how fast the user 105 changes his or her position. The rate of acceleration may be factored into determining whether or not the system 100 will adjust the content display orientation, or quickly the system 100 will adjust the content display orientation, or both. In one embodiment, the system 100 and methods may also include tracking the eyes 108*a-b* to control screen timeouts or screensavers of the device 110. For example, the system 100 may be configured to suspend a screen timeout on the device 110 when the position of the eyes 108*a-b* are detected by the system 100. As another example, the system 100 may be configured to activate a screen timeout when the position of the eyes 108*a-b* are undetected. As yet another example, the system 100 may be configured to activate the device 110 from a sleep state when the position of the eyes 108*a-b* are detected. Of course, the system 100 may be configured to activate or deactivate any program on the device 110 based on detection of any desired body part 130 of the user 105, or desired object, or both. In yet another embodiment, the system 100 may include adjusting the content display orientation of the content 112 of the device 110 based on a detected head position of the user 105.

In one embodiment, the system 100 may be configured to simultaneously adjust content display orientations with respect to multiple users using the same device 110. For the purposes of adjusting content display orientations with respect to multiple users using the same device 110, simultaneously adjusting the content display orientation may involve adjusting the orientations for each user at or near the same time. For example, if a first user is working on the front side of an interactive glass display and a second user is working on the back side of the interactive display, the system 100 can adjust the content display orientation for content displayed on the front side to be aligned with the eye gaze plane and body part of the first user, and also simultaneously adjust the content display orientation of content displayed on the back side to be aligned with the eye gaze plane and body part of the second user. In traditional systems that do not utilize the technology as described in the present disclosure, if two users are working on opposite sides of an interactive display, one user can typically see the content aligned properly from his perspective, while the other user on the back side will often see content that is inverted.

In still another embodiment, the system 100 may be configured to adjust content display orientation for 3-dimensional (3-D) content and devices. Traditionally, in order to effectively view 3-D content, a user's 105 head must be aligned properly with the display. Otherwise, if the user's 150 head is not aligned properly, the 3-D experience and effect are completely ruined. However, if the system 100 determines the position of the user's 105 eyes 108*a-b* and the position of the reference body part 130, the content display orientation for a device 110 displaying 3-D content may be adjusted accordingly. In one embodiment, the system 100 may adjust the entire displayed 3-D content to match the user's orientation. In another embodiment, the system 100 may create a synthetic image that retains the vertical orientation of the content, but the 3-D image offset may be synthesized based on the user's current position and orientation. The device 110 may process 3-D content and alter it to be adjust to the user's orientation so that the user can effectively enjoy the content and be ensured to have an enjoyable viewing experience. In one embodiment, if the content display is 3-D computer-generated imagery, such as used in video games, the user's 105 head orientation may be passed to a processor to adjust any disparities in orientation in real time. In another embodiment, if the content is recorded video and the device for displaying the content is a television or other similar device, the device can use any vertical disparities to create a 3-D model of a visual scene. Additionally, the device can re-render the visual scene for the user's 105 non-vertical head orientation, and use estimation to fill around edges that are now visible that were not visible in a previous view of the scene. This may allow for highly accurate and reliable for 3-D scenes, while minimizing distortions and errors.

It is important to note that the methods described above may incorporate any of the functionality, devices, and/or features of the systems described above, or otherwise, and are not intended to be limited to the description or examples provided herein.

Figure 7:
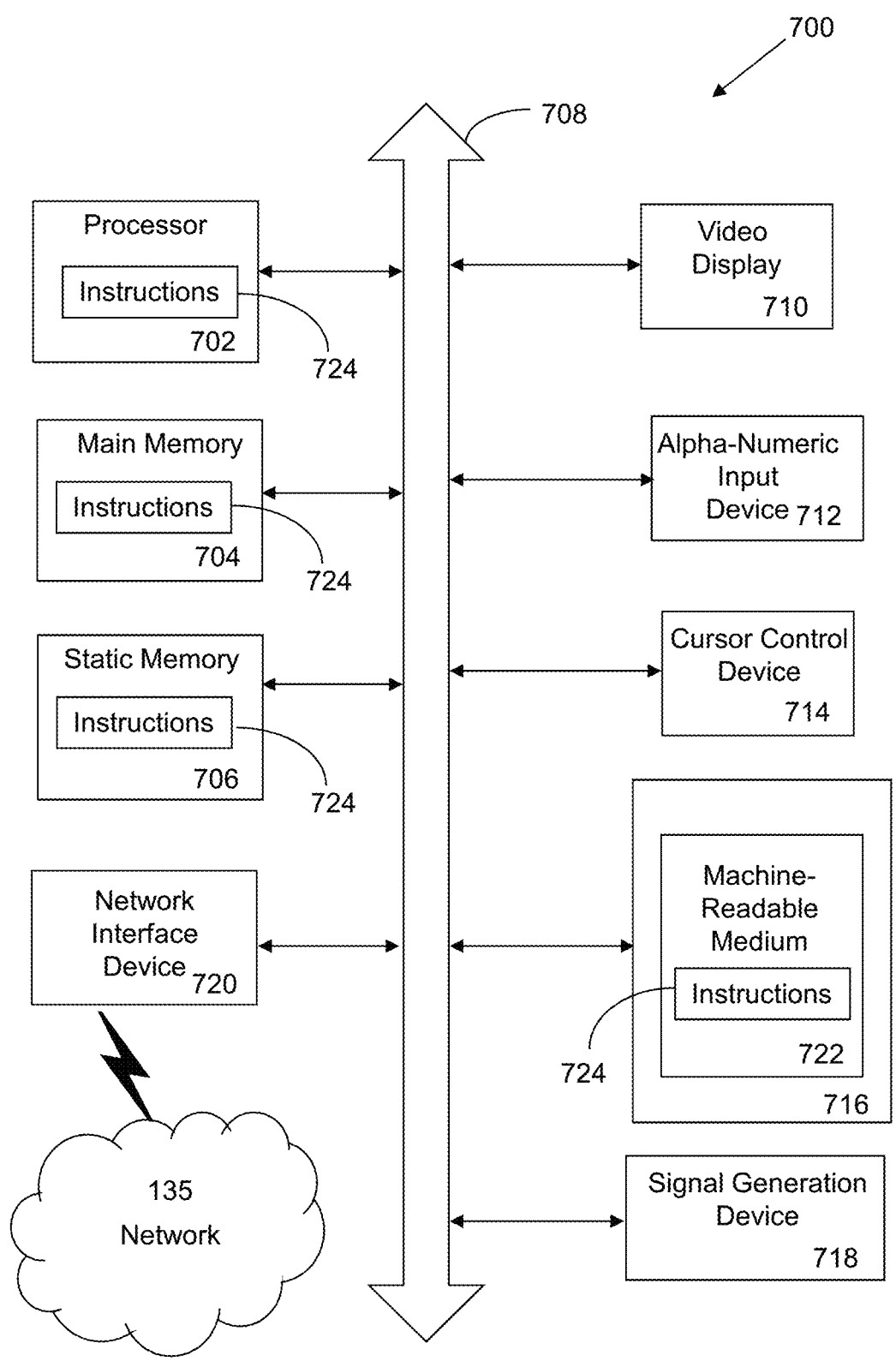
FIG. 7 is a diagrammatic representation of a machine in the form of a computer system within which a set of instructions, when executed, may cause the machine to perform any one or more of the methodologies discussed herein.

Referring now also to FIG. 7, at least a portion of the methodologies and techniques described with respect to the exemplary embodiments can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a stand-alone device. In some embodiments, the machine may be connected (e.g., using a network 135) to and assist with operations performed by other machines, such as, but not limited to, the device 110, the server 140, the database 145, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 704, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions 724 (e.g., software) embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 722 containing instructions 724 so that a device connected to the communications network 135 can send or receive voice, video or data, and to communicate over the network 135 using the instructions. The instructions 724 may further be transmitted or received over the network 135 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
      receiving data pertaining to a user and a device, the data including an eye gaze plane of the user relative to the device and a position of a body part of the user relative to a reference point other than on a face of the user;
      based on the data, determining a change in body orientation and position of the user;

comparing the change in body orientation and position of the user with a threshold value;

responsive to the change in body orientation and position of the user exceeding the threshold value, adjusting a content display orientation associated with content displayed on the device; and responsive to the change in body orientation and position of the user failing to exceed the threshold value, maintaining the content display orientation unchanged.

2. The system of claim 1, wherein the operations further comprise determining whether the user has moved a threshold amount to cause a mismatch between the content display orientation and the eye gaze plane.

3. The system of claim 2, wherein the operations further comprise readjusting the content display orientation if the user has moved the threshold amount to cause the mismatch.

4. The system of claim 2, wherein the operations further comprise maintaining the content display orientation if the user has not moved the threshold amount to cause the mismatch.

5. The system of claim 1, wherein the operations further comprise adjusting the content display orientation based on a different body part.

6. The system of claim 1, wherein the operations further comprise adjusting an orientation for receiving a gesture from the user on the device.

7. The system of claim 1, wherein the operations further comprise determining the position of the body part.

8. The system of claim 1, wherein the operations further comprise determining the eye gaze plane of the user based on a location of each eye of the user.

9. The system of claim 1, wherein the operations further comprise determining a reference zone for adjusting the content display orientation.

10. The system of claim 1, wherein the operations further comprise activating a screen timeout when a position of each eye of the user is not detected.

11. The system of claim 1, wherein the operations further comprise activating the device from a sleep state when a position of each eye of the user is detected.

12. The system of claim 1, wherein the operations further comprise activating a program on the device based on detection of an object, detection of the body part, or a combination thereof.

13. The system of claim 1, wherein the operations further comprise simultaneously adjusting the content display orientation with respect to the user and another user.

14. A method, comprising:

accessing data pertaining to a user and a device, the data including an eye gaze plane of the user relative to the device and a position of a body part of the user relative to a reference point other than on a face of the user;

based on the data, determining a change in body orientation and position of the user;

comparing the change in body orientation and position of the user with a threshold value;

responsive to the change in body orientation and position of the user exceeding the threshold value, adjusting, by utilizing instructions from a memory that are executed by a processor, a content display orientation associated with content displayed on the device; and responsive to the change in body orientation and position of the user failing to exceed the threshold value, maintaining the content display orientation unchanged.

15. The method of claim 14, further comprising deactivating a program on the device based on detection of an object, detection of the body part, or a combination thereof.

16. The method of claim 14, further comprising recording media content of the user by using an image capture device of the device.

17. The method of claim 14, further comprising preventing an inversion of the content display orientation of the device when the device is tilted away from the user and the user is in an upright position.

18. The method of claim 14, further comprising adjusting an orientation for receiving a gesture from the user on the device.

19. The method of claim 14, further comprising determining whether the user has moved a threshold amount to cause a mismatch between the content display orientation and the eye gaze plane.

20. A non-transitory computer-readable device comprising instructions, which when executed by a processor, cause the processor to perform operations comprising:

obtaining data pertaining to a user and a device, the data including an eye gaze plane of the user relative to the device and a position of a body part of the user relative to a reference point other than on a face of the user;

based on the data, determining a change in body orientation and position of the user;

comparing the change in body orientation and position of the user with a threshold value;

responsive to the change in body orientation and position of the user exceeding the threshold value, modifying a content display orientation associated with content displayed on the device; and responsive to the change in body orientation and position of the user failing to exceed the threshold value, maintaining the content display orientation unchanged.

* * * * *